(12) United States Patent
Nakamura et al.

(10) Patent No.: US 11,530,559 B2
(45) Date of Patent: Dec. 20, 2022

(54) HINGE

(71) Applicant: SHOWA DENKO MATERIALS CO., LTD., Tokyo (JP)

(72) Inventors: Shigeya Nakamura, Tokyo (JP); Kyoichi Tomita, Tokyo (JP); Teruhiko Iwata, Tokyo (JP); Shigeo Suzuki, Tagawa (JP); Masayuki Onodera, Tagawa (JP); Yasuko Aizawa, Tagawa (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 15 days.

(21) Appl. No.: 17/340,547

(22) Filed: Jun. 7, 2021

(65) Prior Publication Data

US 2021/0310286 A1    Oct. 7, 2021

Related U.S. Application Data

(62) Division of application No. 16/497,845, filed as application No. PCT/JP2017/040475 on Nov. 9, 2017, now abandoned.

(30) Foreign Application Priority Data

Mar. 30, 2017 (JP) .................................. 2017-068152

(51) Int. Cl.
  *E05D 5/06* (2006.01)
  *E05D 3/02* (2006.01)

(52) U.S. Cl.
  CPC .............. *E05D 5/062* (2013.01); *E05D 3/02* (2013.01); *E05Y 2800/674* (2013.01); *E05Y 2800/676* (2013.01); *E05Y 2900/532* (2013.01)

(58) Field of Classification Search
  CPC ........... E05D 5/062; E05D 5/06; E05D 5/065; E05D 2007/0067
  See application file for complete search history.

(56) References Cited

U.S. PATENT DOCUMENTS

| 863,132 A | * | 8/1907 | Angelo | ..................... E05D 3/02 16/377 |
| 1,228,257 A | * | 5/1917 | Stuck | ..................... E05D 5/062 296/76 |

(Continued)

FOREIGN PATENT DOCUMENTS

| CN | 103255968 | 8/2013 |
| JP | 10-175446 | 6/1998 |

(Continued)

*Primary Examiner* — Jeffrey O'Brien
(74) *Attorney, Agent, or Firm* — Wenderoth, Lind & Ponack, L.L.P.

(57) ABSTRACT

A hinge includes: a vehicle body-side hinge member that includes a vehicle body attachment portion for attachment to a vehicle body; a back door-side hinge member that includes a door attachment portion for attachment to a back door and a coupling portion extending from the door attachment portion toward the vehicle body-side hinge member, the coupling portion including a reinforcing rib on both edges in a width direction intersecting an extension direction of the coupling portion; and a rotational support member that couples an end portion, at a side of the vehicle body-side hinge member, of the coupling portion together with the vehicle body-side hinge member, and that supports the vehicle body-side hinge member and the back door-side hinge member so as to allow relative rotation of the vehicle body-side hinge member and the back door-side hinge member.

2 Claims, 13 Drawing Sheets

(56) References Cited

U.S. PATENT DOCUMENTS

| | | | | |
|---|---|---|---|---|
| 2,973,547 | A * | 3/1961 | Heyer | E05D 5/065 16/392 |
| 3,006,039 | A * | 10/1961 | Brydolf | E05D 5/06 16/389 |
| 3,663,987 | A * | 5/1972 | Hawkins | E05D 5/06 16/387 |
| 3,729,223 | A * | 4/1973 | Leissa | B60J 5/101 296/106 |
| 4,012,807 | A * | 3/1977 | Kern | E05D 3/16 180/69.2 |
| 4,206,944 | A * | 6/1980 | Kumagai | E05F 1/1276 296/76 |
| 4,839,941 | A * | 6/1989 | Orlando | E05D 3/18 16/361 |
| 5,412,843 | A * | 5/1995 | Krongauz | E05D 5/06 248/300 |
| 5,557,827 | A * | 9/1996 | Lautenschlager | E05D 5/0276 16/382 |
| 6,618,904 | B1 * | 9/2003 | Nagy | E05F 1/1215 16/370 |
| 6,789,834 | B2 * | 9/2004 | Schlegel | E05F 15/63 296/193.11 |
| 7,021,698 | B2 * | 4/2006 | Yamada | E05D 5/0207 296/146.16 |
| 7,748,767 | B2 * | 7/2010 | Terhaar | B60J 7/1621 296/100.06 |
| 7,966,695 | B2 * | 6/2011 | Salice | E05F 1/1284 16/335 |
| 8,141,671 | B2 * | 3/2012 | Aoki | B60R 21/38 180/274 |
| 8,251,431 | B2 * | 8/2012 | Nakazato | E05D 5/062 296/76 |
| 8,336,666 | B2 * | 12/2012 | Thomas | B60R 21/34 296/193.11 |
| 8,595,901 | B1 * | 12/2013 | Shaw | E05D 5/062 296/193.11 |
| 9,145,174 | B2 * | 9/2015 | Iwano | B62D 25/163 |
| 9,180,761 | B1 * | 11/2015 | Watterworth | E05D 5/062 |
| 9,352,641 | B2 * | 5/2016 | Chapman | B62D 33/042 |
| 9,551,175 | B2 * | 1/2017 | Labbe | E05D 3/02 |
| 9,752,362 | B2 * | 9/2017 | Nakayama | E05D 11/10 |
| 9,783,154 | B2 * | 10/2017 | Kim | E05D 5/062 |
| 10,221,600 | B2 * | 3/2019 | Slemons | E05D 5/062 |
| 10,697,217 | B2 * | 6/2020 | Sawada | E05D 5/043 |
| 10,883,294 | B2 * | 1/2021 | Molyneux | E05D 3/022 |
| 2006/0059662 | A1 * | 3/2006 | Roeper | E05D 5/06 16/382 |
| 2008/0156556 | A1 * | 7/2008 | Takahashi | B62D 25/12 180/69.21 |
| 2008/0178427 | A1 * | 7/2008 | Chen | E05F 5/022 16/277 |
| 2010/0005628 | A1 * | 1/2010 | Jung | E05D 3/10 296/193.11 |
| 2011/0035906 | A1 * | 2/2011 | Esaki | E05D 5/062 16/374 |
| 2017/0321463 | A1 * | 11/2017 | Morinaga | B60J 5/04 |
| 2017/0362868 | A1 * | 12/2017 | Veloso | E05D 7/1005 |
| 2018/0135341 | A1 * | 5/2018 | Sawada | E05D 5/043 |
| 2019/0003223 | A1 * | 1/2019 | Page | E05D 3/02 |
| 2019/0383074 | A1 * | 12/2019 | Schabenberger | E05D 5/0207 |

FOREIGN PATENT DOCUMENTS

| | | |
|---|---|---|
| JP | 2001-206062 | 7/2001 |
| JP | 2001-303831 | 10/2001 |
| JP | 2007-30600 | 2/2007 |
| JP | 5831285 | 12/2015 |

* cited by examiner

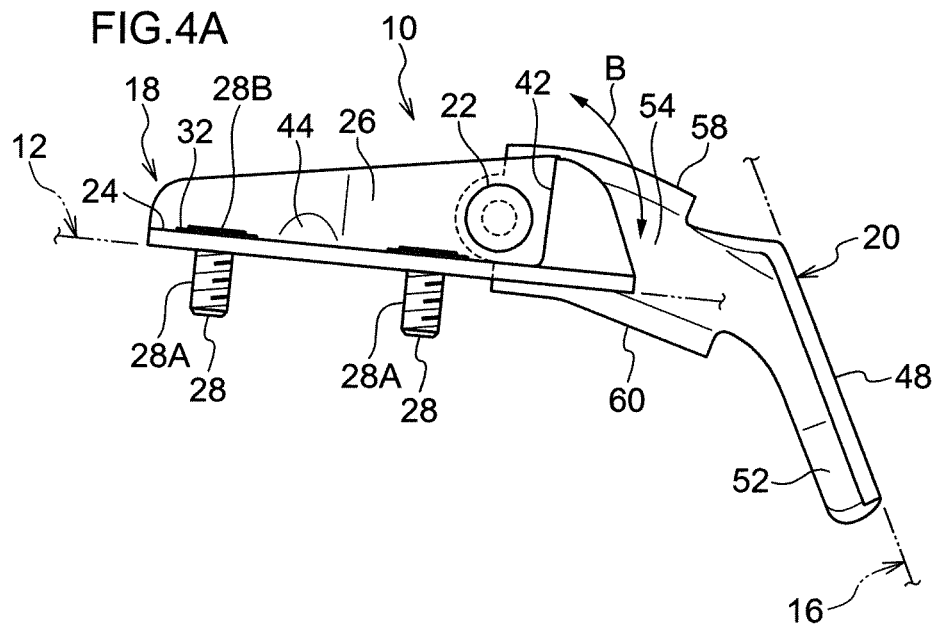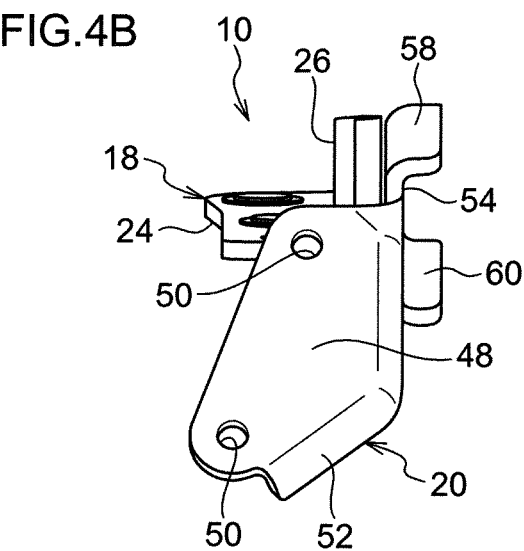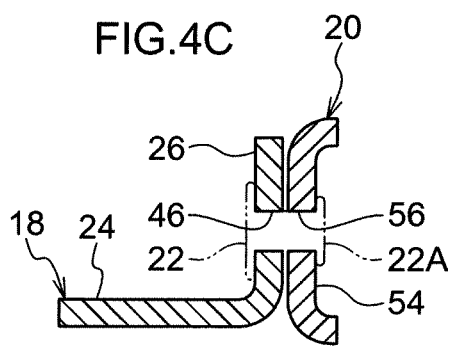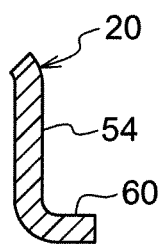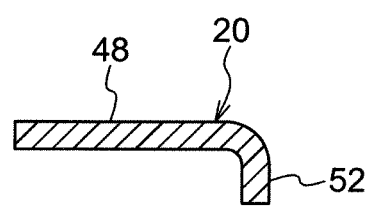

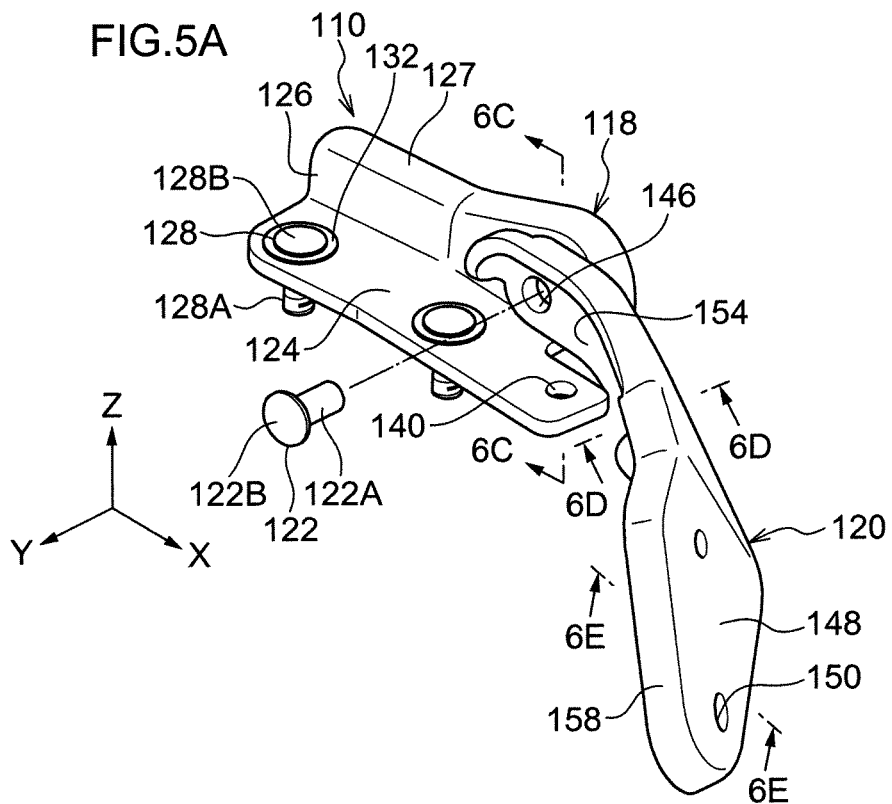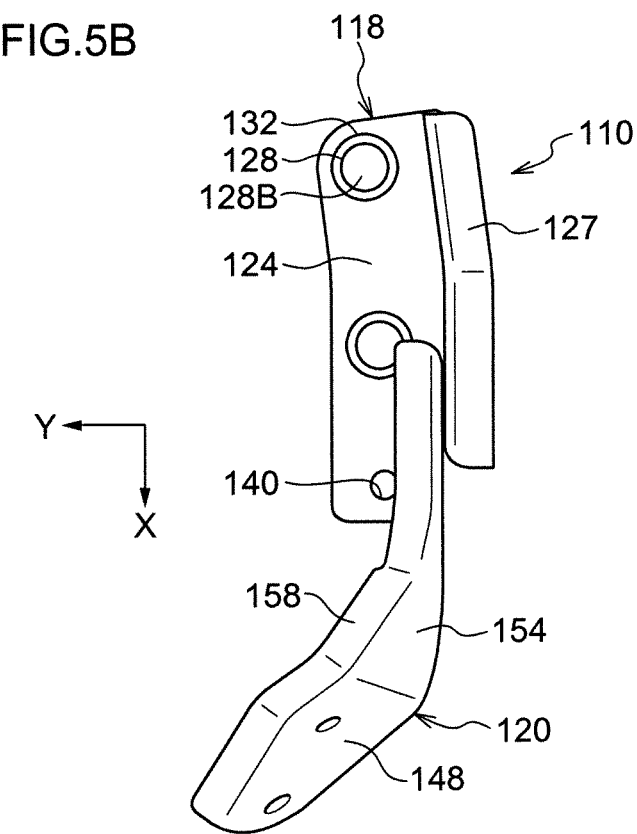

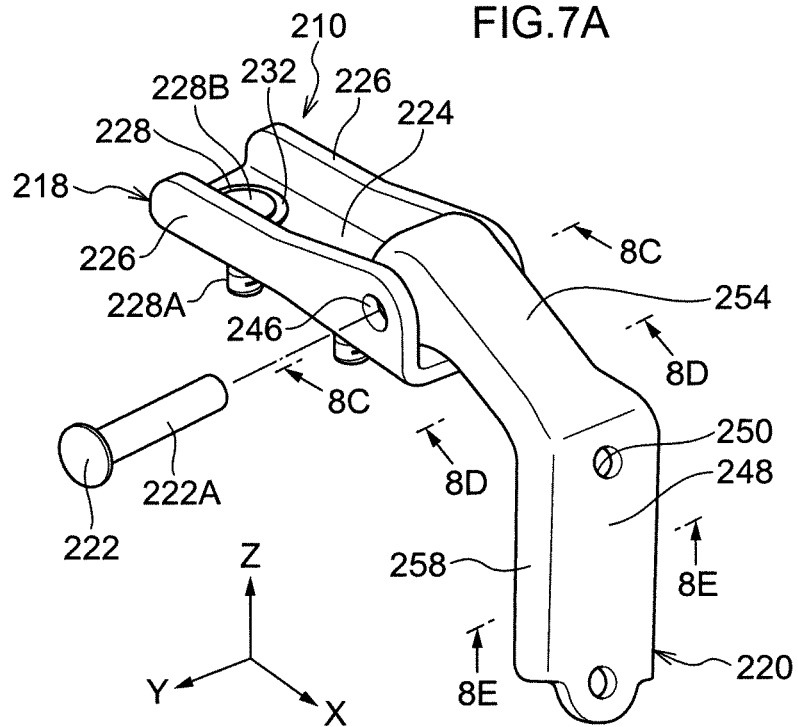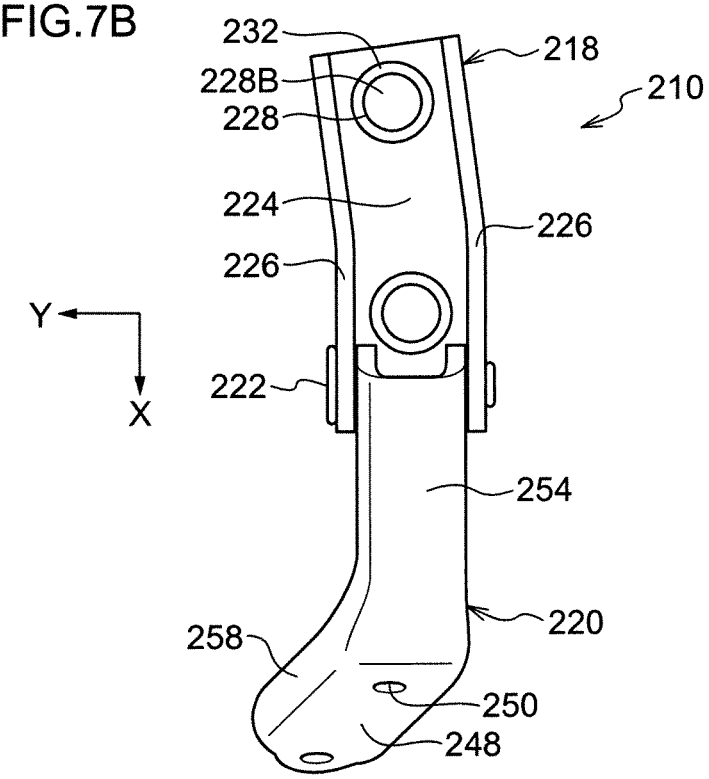

HINGE

CROSS-REFERENCE TO RELATED APPLICATIONS

This application is a divisional application of U.S. application Ser. No. 16/497,845, filed Sep. 26, 2019, which is a U.S. national phase application filed under 35 U.S.C. § 371 of International Application No. PCT/JP2017/040475, filed Nov. 9, 2017, designating the United States, which claims priority from Japanese Patent Application No. 2017-068152, filed Mar. 30, 2017, designating the United States, the entire contents of each of which are hereby incorporated herein by reference.

TECHNICAL FIELD

The present disclosure relates to a hinge.

BACKGROUND ART

More efficient engines, more lightweight vehicle bodies, and development of Electric Vehicles (EVs), Hybrid Electric Vehicles (HEVs), and Fuel Cell Vehicles (FCVs) are being pursued as a necessity in order to prevent the global environment and cut ecosystem-threatening greenhouse gases. Some automobile components that were made of sheet metal are now being made from resin, contributing to more lightweight vehicle bodies. A switch to resin is also being adopted in the case of resin back door configuration members installed in a rear section of an automobile (see, for example, JP-A Nos. 2001206062 and 2007-30600).

SUMMARY OF INVENTION

Technical Problem

In vehicle bodies provided with a back door, sometimes noise can be heard from the back door during travel, due to road surface conditions or the like. Since increasing the rigidity of the back door is thought to enable the occurrence of noise from the back door to be suppressed, attempts have been made in which a back door with a higher rigidity has been attached to a vehicle body. However, although the occurrence of noise can be suppressed to some extent, this leads to a marked increase in the weight of the back door, which is counterproductive to weight reduction.

An object of the present disclosure is to provide a hinge capable of suppressing the occurrence of noise while maintaining the light weight of a back door.

Solution to Problem

In consideration of the above issues, the present disclosure includes the following aspects.

(1) A hinge includes: a vehicle body-side hinge member that is provided with a vehicle body attachment portion for attachment to a vehicle body; a back door-side hinge member that is provided with a door attachment portion for attachment to a back door and with a coupling portion extending from the door attachment portion toward the vehicle body-side hinge member, the coupling portion being formed with a reinforcing rib on both edges in a width direction intersecting an extension direction of the coupling portion; and a rotational support member that couples an end portion, at a side of the vehicle body-side hinge member, of the coupling portion together with the vehicle body-side hinge member, and that supports the vehicle body-side hinge member and the back door-side hinge member so as to allow relative rotation of the vehicle body-side hinge member and the back door-side hinge member.

(2) The hinge of (1), wherein the reinforcing rib is formed continuously with an edge of the door attachment portion.

(3) The hinge of either (1) or (2), wherein: the vehicle body attachment portion is provided with a support wall that extends along a front-rear direction of the vehicle body and that supports the rotational support member; and the support wall is formed with a step that is displaced in a width direction of the vehicle body and that is coupled to the vehicle body attachment portion.

Advantageous Effects of Invention

The disclosure is capable of suppressing movement of the back door during travel and suppressing the occurrence of noise.

BRIEF DESCRIPTION OF DRAWINGS

FIG. 2A is a perspective view illustrating a hinge according to a first exemplary embodiment.

FIG. 2B is a plan view illustrating a hinge according to the first exemplary embodiment.

FIG. 4A is a front view illustrating a hinge according to the first exemplary embodiment.

FIG. 4B is a side view illustrating a hinge according to the first exemplary embodiment.

FIG. 4C is a cross-section of the hinge illustrated in FIG. 2A taken along line 4C-4C.

FIG. 4D is a cross-section of the hinge illustrated in FIG. 2A taken along line 4D-4D.

FIG. 4E is a cross-section of the hinge illustrated in FIG. 2A taken along line 4E-4E.

FIG. 5A is a perspective view illustrating a hinge according to a second exemplary embodiment.

FIG. 5B is a plan view illustrating a hinge according to the second exemplary embodiment.

FIG. 7A is a perspective view illustrating a hinge according to a third exemplary embodiment.

FIG. 7B is a plan view illustrating a hinge according to the third exemplary embodiment.

DESCRIPTION OF EMBODIMENTS

Figure 1A:
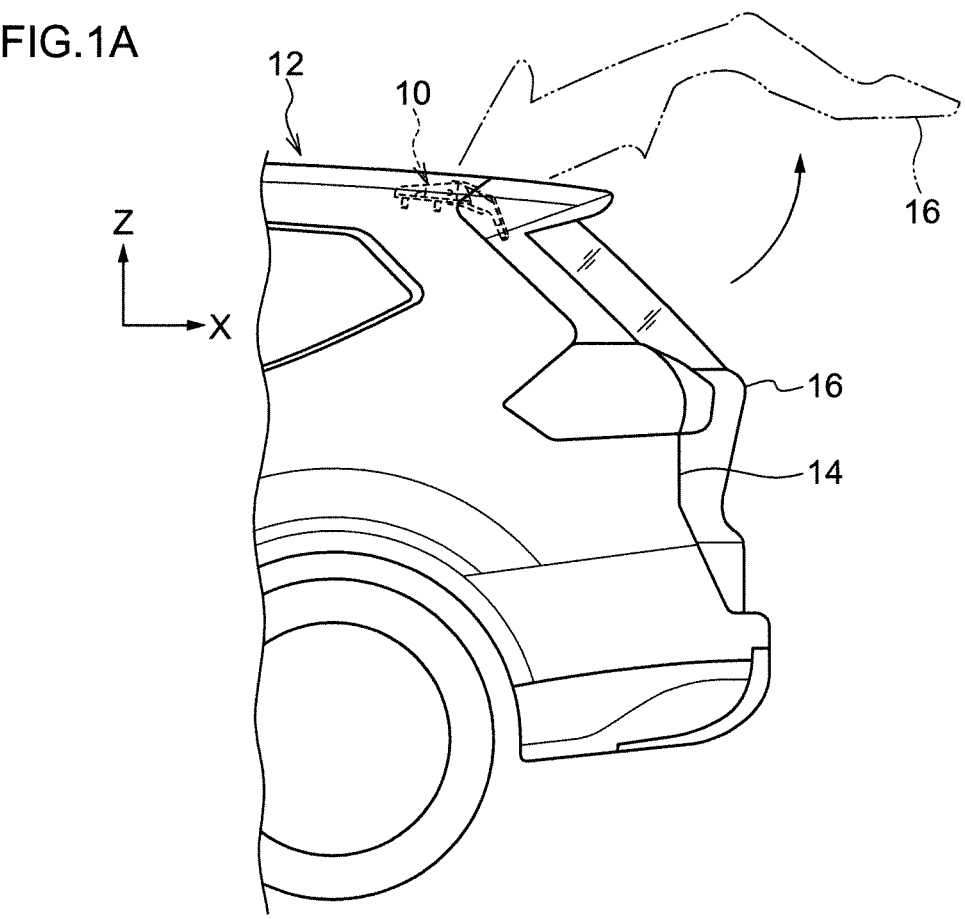
FIG. 1A is a side view from the left illustrating a vehicle body to which a hinge according to a first exemplary embodiment is attached.

Detailed explanation follows regarding exemplary embodiments of the present disclosure. Note that the present disclosure is not limited to the following exemplary embodiments. In the following exemplary embodiments, configuration elements are not essential requirements except where expressly indicated. Likewise, the present disclosure is not limited the values and ranges thereof.

A hinge according to an aspect of the present disclosure includes a vehicle body-side hinge member, a back door-side hinge member, and a rotational support member. The vehicle body-side hinge member is provided with a vehicle body attachment portion for attachment to a vehicle body. The back door-side hinge member is provided with a door attachment portion for attachment to a back door and with a coupling portion extending from the door attachment portion toward the vehicle body-side hinge member, the coupling portion being formed with a reinforcing rib on both edges in a width direction intersecting an extension direction of the coupling portion. The rotational support member couples an end portion, at a side of the vehicle body-side hinge member, of the coupling portion together with the vehicle body-side hinge member, and supports the vehicle body-side hinge member and the back door-side hinge member so as to allow relative rotation of the vehicle body-side hinge member and the back door-side hinge member.

Since resin has superior vibration damping characteristics to metal, a back door made of resin was thought to have the advantage of enabling noise (vibration) occurring in a vehicle body to be absorbed compared to a conventional back door made of sheet steel. However, the occurrence of noise could not be sufficiently suppressed simply by making the back door of resin. Upon further investigation, it was found that noise during travel occurs due to movement of the entire back door. It was also found that it was difficult to suppress movement of the entire back door by changing the materials, reinforcement, or the like of the back door. It was discovered that, out of the many components, an attachment portion that couples the back door and the vehicle body together is important in suppressing movement of the entire back door.

In the hinge described above, the reinforcing rib is formed on both edges in the width direction intersecting the extension direction of the coupling portion positioned between the vehicle body attachment portion and the back door attachment portion. Thus, the second moment of area of the coupling portion is greater than it would be in cases in which the rib is not formed. This enables the bending rigidity and twisting rigidity to be improved without increasing the sheet thickness of the members configuring the hinge. This thereby enables the deformation amount of the hinge itself to be suppressed in comparison to structures in which the reinforcing rib is not formed on both edges in the width direction intersecting the extension direction. Supporting the back door on the vehicle body through the hinge in this manner enables the twisting rigidity of the back door supported by the vehicle body to be improved, such that movement of the entire back door during travel is suppressed, and the occurrence of noise is suppressed.

The reinforcing rib of the hinge may be formed continuously with an edge of the door attachment portion. In such cases, since the reinforcing rib formed to the coupling portion of the hinge is formed continuously with the edge of the door attachment portion, the bending rigidity and twisting rigidity or the back door-side hinge member can be further improved, and the twisting rigidity of the back door supported by the vehicle body can be further improved.

The vehicle body attachment portion of the hinge may be provided with a support wall that extends along a front-rear direction of the vehicle body and that supports the rotational support member, and the support wall may be formed with a step that is displaced in a width direction of the vehicle body and that is coupled to the vehicle body attachment portion. In such cases, the back door-side hinge member of the hinge is supported by the support wall provided to the vehicle body attachment portion through the rotational support member. Moreover, the support wall provided to the vehicle body attachment portion is formed with the step that is displaced in the vehicle body width direction and that is coupled to the vehicle body attachment portion, thereby enabling the bending rigidity of the support wall with respect to load applied in the vehicle body width direction to be improved. This enables deformation of the support wall to be suppressed and enables twisting rigidity of the back door supported by the vehicle body to be further improved, in comparison to cases in which the support wall of the vehicle body-side hinge member is not formed with the step.

First Exemplary Embodiment

Explanation follows regarding a hinge 10 according to a first exemplary embodiment, with reference to the drawings. However, there is no limitation to this exemplary embodiment. The sizes of members illustrated in the drawings are merely exemplary, and the relative sizes of members are not limited thereto. Note that in the drawings used to explain the exemplary embodiments, the arrow X indicates a vehicle body rear side, the arrow Y indicates a vehicle body width direction outside, and the arrow Z indicates a vehicle body upper side.

As illustrated in FIG. 1A, a rear section of a vehicle body 12 is provided with a back door opening 14. The back door opening 14 is capable of being opened and closed by a flip-up type back door 16. The back door 16 is supported by a left and right pair of the hinges 10 disposed between the back door 16 and an upper portion of the back door opening 14 such that the back door 16 is capable of opening upward and closing downward. Note that in FIG. 1A, the back door 16 when flipped up is illustrated by double-dotted dash lines.

The back door 16 to which the hinge 10 of the present exemplary embodiment is attached is what is referred to as a resin back door, of which the main configuration members are formed from resin. As an example, the back door 16 includes a resin outer panel, a resin inner panel, and the like.

Figure 1B:
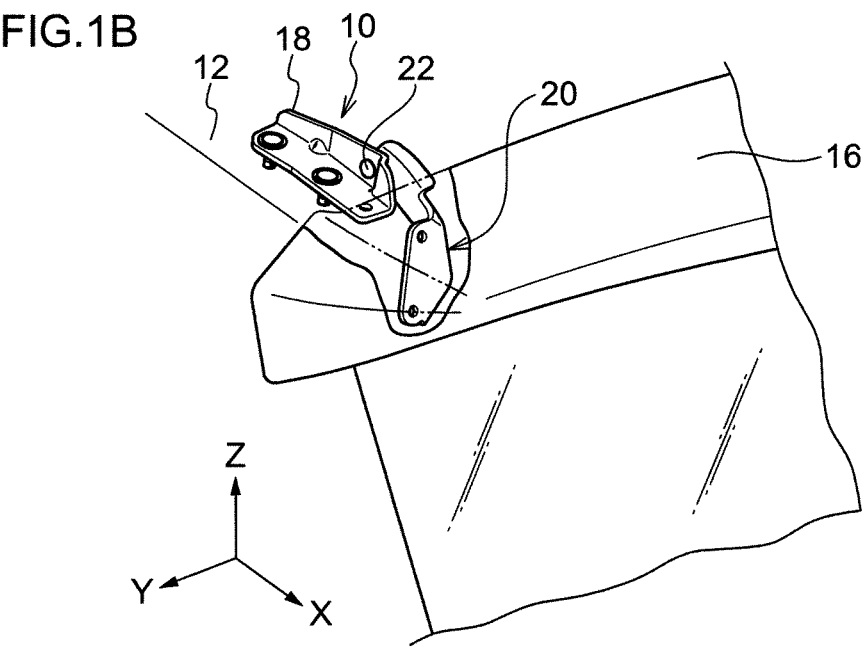
FIG. 1B is a perspective view illustrating the hinge of FIG. 1A attached to the vehicle body and a back door.

The hinge 10 of the present exemplary embodiment includes a vehicle body-side hinge member 18 attached to the vehicle body 12, a back door-side hinge member 20 attached to the back door 16, and a rotation pin 22, serving as a rotational support member, that supports the vehicle body-side hinge member 18 and the back door-side hinge member 20 so as to allow relative rotation of the vehicle body-side hinge member 18 and the back door-side hinge member 20. Note that although not illustrated in the drawings, a hinge 10 having left-right symmetry to the hinge 10 illustrated in FIG. 1B is attached to the vehicle body 12 on the right side.

The vehicle body-side hinge member 18 of the present exemplary embodiment is, for example, formed by pressing 3.2 mm thick sheet steel. Note that the thickness of the sheet steel configuring the vehicle body-side hinge member 18 is not limited to 3.2 mm. The back door-side hinge member 20 of the present exemplary embodiment is, for example, formed by pressing 5.0 mm sheet steel. Note that the thickness of the sheet steel configuring the back door-side hinge member 20 is not limited to 5.0 mm.

Figures 2A, 2B:
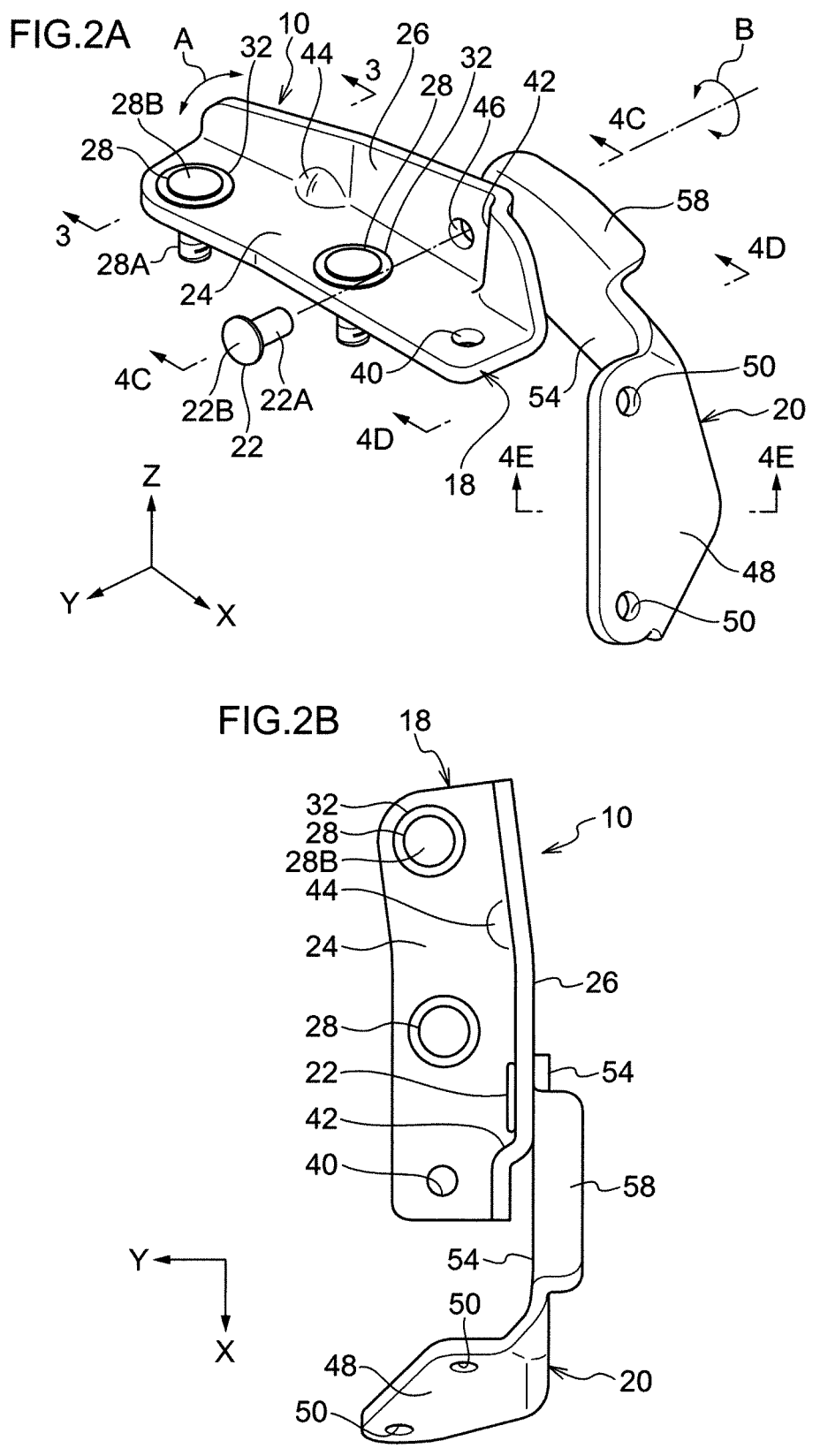

FIG. 2A and FIG. 2B are perspective views illustrating the hinge 10 attached to the left side of the vehicle body 12. As illustrated in FIG. 2A, the vehicle body-side hinge member 18 includes a vehicle body attachment portion 24 extending along a front-rear direction of the vehicle body 12 (the arrow X direction and the opposite direction to the arrow X direction in FIG. 2A) and contacting and fixed to an upper section of the vehicle body 12. A vehicle width direction inside (the opposite direction to the arrow Y direction in FIG. 2A) end edge of the vehicle body attachment portion 24 of the vehicle body-side hinge member 18 is integrally formed with a support wall 26, serving as a support wall formed extending upward. In the present exemplary embodiment, the support wall 26 is perpendicular to the vehicle body attachment portion 24.

Figure 3:
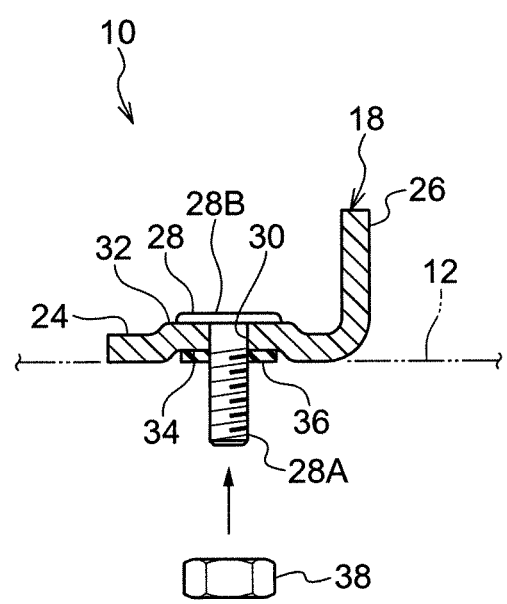
FIG. 3 is a cross-section of the hinge illustrated in FIG. 2A taken along line 3-3.

As illustrated in FIG. 2A and FIG. 3, two bolts 28 used to attach the vehicle body-side hinge member 18 to the vehicle body 12 with nuts 38 (see FIG. 3) are joined to the vehicle body attachment portion 24 so as to be spaced apart from each other in the vehicle body front-rear direction. Threaded portions 28A of the bolts 28 are passed downward through holes 30 (see FIG. 3) formed in the vehicle body attachment portion 24, and the threaded portions 28A passed through the holes 30 project toward the lower side of the vehicle body attachment portion 24.

As illustrated in FIG. 3, upward facing ring shaped protrusions 32 with larger diameters than the diameters of the holes 30 are formed by pressing to an upper face of the vehicle body attachment portion 24 at the peripheries of the holes 30. Heads 28B of the two bolts 28 are joined to apex faces of the protrusions 32 by welding or the like.

A lower face of the vehicle body attachment portion 24 is formed with ring shaped recesses 34 on the opposite side to the protrusions 32. Ring shaped water leakage prevention rubber packing 36 is inserted into the recesses 34. The water leakage prevention rubber packing 36 closely contacts the vehicle body 12 and the vehicle body attachment portion 24 to suppress the incursion of water to the vehicle body 12 interior when the vehicle body-side hinge member 18 has been attached to the vehicle body 12 using the nuts 38.

As illustrated in FIG. 2A and FIG. 2B, the vehicle body attachment portion 24 is further formed with a positioning hole 40, used for positioning, at the vehicle body rear side (the arrow X direction side in FIG. 2 and FIG. 2B). A positioning protrusion (not illustrated in the drawings) provided to the vehicle body 12 is inserted into the positioning hole 40.

A step 42 that is displaced in the vehicle width direction is formed on the vehicle body rear side of the support wall 26. A corner portion between the vehicle body attachment portion 24 and the support wall 26 is pressed to form a protrusion 44 further toward the vehicle body front side than the step 42. The support wall 26 is suppressed from deforming in a direction to collapse with respect to the vehicle body attachment portion 24 (the arrow A direction in FIG. 2A).

The support wall 26 is formed with gradually decreasing height on progression from the step 42 toward the vehicle body front side. This structure enables interference with the back door 16 when the back door 16 has been fully opened to be prevented.

As illustrated in FIG. 2A and FIG. 4C, the support wall 26 is formed with a pin hole 46 in the vicinity of the vehicle body front side of the step 42. A shaft 22A of a rotation pin 22 is rotatably inserted through the pin hole 46. Note that the shaft 22A is fixed to a coupling portion 54, described later, by swaging or the like in a state in which the shaft 22A has been inserted into a pin fixing hole 56 in the coupling portion 54.

The back door-side hinge member 20 is disposed at the vehicle width direction inside (the opposite direction to the arrow Y direction) of the support wall 26 of the vehicle body-side hinge member 18. The back door-side hinge member 20 includes a flat plate shaped back door attachment portion 48 contacting and fixed to a side section inside portion of the back door 16. The back door attachment portion 48 is formed with a pair of holes 50. The back door-side hinge member 20 is attached to the back door 16 using bolts (not illustrated in the drawings) inserted through the holes 50, and nuts (not illustrated in the drawings). In a state in which the back door attachment portion 48 has been attached to the back door 16 that has closed off the back door opening 14, as illustrated in FIG. 4A, the back door attachment portion 48 is inclined with respect to a vertical direction. Note that the larger the back door attachment portion 48, the greater the tendency to disperse load acting on the hinge 10 and thereby suppress deformation. Moreover, in cases in which the hinge 10 is employed in a standard passenger car, as an example, the distance between the centers (pitch) of the two holes 50 is preferably from 10 mm to 80 mm, and is more preferably from 30 mm to 60 mm.

A vehicle width direction inside edge of the back door attachment portion 48 is pressed to form a rib 52 projecting out perpendicular to the back door attachment portion 48 toward the opposite side to the back door 16. The flat plate shaped coupling portion 54 extends integrally from an upper side portion of the rib 52 toward the pin hole 46 of the vehicle body-side hinge member 18. Note that the coupling portion 54 is formed running along the vertical direction.

As illustrated in FIG. 4C, the pin fixing hole 56 is formed in the vehicle body attachment portion 24 side of the coupling portion 54 at a position opposing the pin hole 46 of the vehicle body-side hinge member 18. The shaft 22A is fixed to the coupling portion 54 by swaging or the like in a state in which the shaft 22A of the rotation pin 22 has been inserted through the pin fixing hole 56. The back door-side hinge member 20 is thus capable of pivoting (in the arrow B direction) about the rotation pin 22 as illustrated in FIG. 4A, thereby enabling the back door 16 to open and close.

As illustrated in FIG. 4A and FIG. 4B, an upper side edge of the coupling portion 54 is formed with a rib 58 projecting out toward the vehicle width direction inside from the coupling portion 54 by pressing or the like. A lower side edge of the coupling portion 54 is formed with a rib 60 projecting out toward the vehicle width direction inside from the coupling portion 54.

As illustrated in FIG. 4A, in the present exemplary embodiment, the rib 58 extends toward the back door attachment portion 48 side from an origin point at the upper side of the center of the rotation pin 22. The rib 60 extends toward the back door attachment portion 48 side from an origin point at the lower side of the center of the rotation pin 22. In the present exemplary embodiment, the rib 60 formed at the lower edge of the coupling portion 54 is longer than the rib 58 formed at the upper edge of the coupling portion 54. Moreover, as illustrated in FIG. 4B, the rib 58 and the rib 60 of the present exemplary embodiment are formed with the same height as each other, and extend with a uniform height from one end to the other end.

Operation and Advantageous Effects

In the hinge 10 of the present exemplary embodiment, the vehicle body attachment portion 24 of the vehicle body-side hinge member 18 is attached to the upper section of the vehicle body 12, and the back door attachment portion 48 of the back door-side hinge member 20 is attached to the back door 16.

In a state in which the hinge 10 is attached to the vehicle body 12 and the back door 16, the coupling portion 54 of the hinge 10 is positioned between the vehicle body 12 and the back door 16, and some of the load from the back door 16 is supported by the vehicle body 12 through the coupling portion 54. The coupling portion 54 is formed with the rib 58 and the rib 60 on both sides in a width direction intersecting the extension direction (the length direction of the coupling portion 54). Accordingly, the second moment of area of the coupling portion 54 is greater than it would be in cases in which the rib 58 and the rib 60 are not formed. This enables the bending rigidity and twisting rigidity of the hinge 10 to be improved without increasing the sheet thicknesses of the sheet steel configuring the hinge 10. This thereby enables the deformation amount of the hinge 10 itself to be suppressed in comparison to structures in which the rib 58 and the rib 60 are not formed in the width direction intersecting the extension direction of the coupling portion 54.

Supporting the back door 16 on the vehicle body 12 through the hinge 10 of the present exemplary embodiment in this manner enables the twisting rigidity of the back door 16 coupled to the vehicle body 12 to be improved, and enables the occurrence of noise caused by twisting deformation of the back door 16 during travel to be suppressed. Since the occurrence of noise caused by twisting deformation of the back door 16 is suppressed, the need to reinforce the back door 16 itself is reduced or eliminated.

Note that the rib 58 formed at the upper side edge of the coupling portion 54 and the rib 60 formed at the lower side edge of the coupling portion 54 are not limited to the formation positions, lengths, heights, sheet thicknesses and the like illustrated in the drawings accompanying the present exemplary embodiment. The rib 58 and the rib 60 may be disposed opposing each other as in FIG. 4B, may be disposed at plural discrete portions in the length direction of the coupling portion 54 so as not to oppose each other, or may be disposed so as to partially oppose each other. Moreover, although the rib 58 and the rib 60 are formed extending toward the vehicle width direction inside in the present exemplary embodiment, either one out of the rib 58 or the rib 60 may be formed extending toward the other side in the vehicle width direction. Whichever of these configurations is applied, it is sufficient that the rib 58 and the rib 60 are both formed to the coupling portion 54 so as to increase the second moment of area of the coupling portion 54.

In the hinge 10 of the present exemplary embodiment, the support wall 26 of the vehicle body-side hinge member 18 is formed with the step 42 that is displaced in the width direction of the vehicle body 12 and coupled to the vehicle body attachment portion 24. The bending rigidity of the support wall 26 with respect to load applied in the vehicle body width direction is thus improved in comparison to cases in which the step 42 is not present. Accordingly, the vehicle body-side hinge member 18 of the present exemplary embodiment enables deformation of the support wall 26 when the support wall 26 is input with load acting in the vehicle body width direction to be suppressed in comparison to configurations in which the vehicle body attachment portion 24 is not formed with the step 42. In this manner, deformation of the support wall 26 that supports the back door-side hinge member 20 can be suppressed, enabling the twisting rigidity of the back door 16 attached to the back door-side hinge member 20 to be further improved.

Note that in the hinge 10 of the present exemplary embodiment, the protrusion 44 formed to the corner portion between the vehicle body attachment portion 24 and the support wall 26 suppresses deformation of the support wall 26 similarly to the step 42.

Second Exemplary Embodiment

Explanation follows regarding a hinge 110 according to a second exemplary embodiment of the present disclosure, with reference to FIG. 5A, FIG. 5B, FIG. 6A to FIG. 6D, and FIG. 6E. Note that configurations matching those of the first exemplary embodiment are allocated the same reference numerals, and explanation thereof is omitted where appropriate.

The hinge 110 of the present exemplary embodiment includes a vehicle body-side hinge member 118 that is attached to a vehicle body (not illustrated in the drawings) similarly to in the first exemplary embodiment, a back door-side hinge member 120 that is attached to a back door (not illustrated in the drawings) similarly to in the first exemplary embodiment, and a rotation pin 122 that supports the vehicle body-side hinge member 118 and the back door-side hinge member 120 so as to allow relative rotation of the vehicle body-side hinge member 118 and the back door-side hinge member 120.

As illustrated in FIG. 5A, the vehicle body-side hinge member 118 includes a vehicle body attachment portion 124 extending along the front-rear direction of the vehicle body (not illustrated in the drawings) and contacting and fixed to an upper section of the vehicle body. A vehicle width direction inside (the opposite direction to the arrow Y direction in FIG. 5A) end edge of the vehicle body attachment portion 124 is integrally formed with a support wall 126, formed extending upward. An edge of the support wall 126 is formed with a rib 127 projecting out perpendicularly from the support wall 126 toward the vehicle width direction inside by pressing or the like. The rib 127 extends from a vehicle body front side end portion of the support wall 126 as far as the lower side of a vehicle body rear side end portion of the support wall 126.

Two bolts 128 used to attach the vehicle body-side hinge member 118 to the vehicle body with nuts (not illustrated in the drawings) are joined to the vehicle body attachment portion 124 so as to be spaced apart from each other in the vehicle body front-rear direction. Threaded portions 128A of the bolts 128 are passed downward through holes (not illustrated in the drawings) formed in the vehicle body attachment portion 124, and the threaded portions 128A passed through the holes project toward the lower side of the vehicle body attachment portion 124.

Figure 6A:
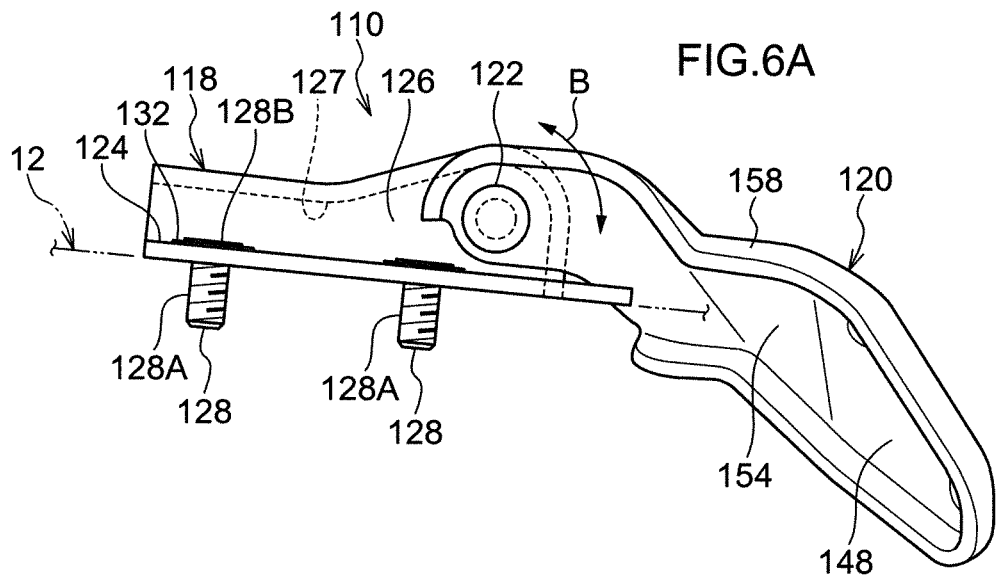
FIG. 6A is a front view illustrating a hinge according to the second exemplary embodiment.
Figure 6B:
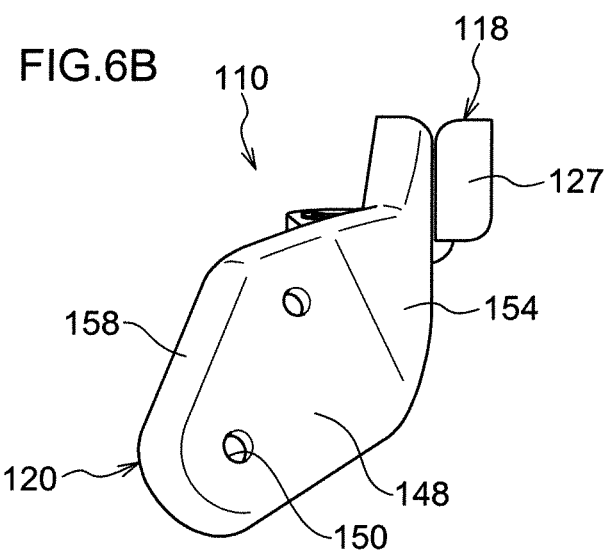
FIG. 6B is a side view illustrating a hinge according to the second exemplary embodiment.

As illustrated in FIG. 5A and FIG. 6A, upward facing ring shaped protrusions 132 are formed by pressing to an upper face of the vehicle body attachment portion 124. Heads 128B of the bolts 128 are joined to apex faces of the protrusions 132 by welding or the like.

A lower face of the vehicle body attachment portion 124 is formed with recesses (not illustrated in the drawings) on the opposite side to the protrusions 132, similarly to the ring shaped recesses 34 of the first exemplary embodiment. Ring shaped water leakage prevention rubber packing (not illustrated in the drawings) is inserted into the recesses.

As illustrated in FIG. 5A, the vehicle body attachment portion 124 is further formed with a positioning hole 140, used for positioning, at the vehicle body rear side (the arrow X direction side in FIG. 5A).

A pin hole 156 is formed in the vehicle body rear side of the support wall 126. A shaft 122A of the rotation pin 122 is inserted into the pin hole 156 so as to be capable of rotating.

The back door-side hinge member 120 is disposed on the vehicle width direction outside (arrow Y direction side) of the vehicle body-side hinge member 118.

The back door-side hinge member 120 includes a flat plate shaped back door attachment portion 148 contacting and fixed to a side section inside portion of the back door. The back door attachment portion 148 is formed with a pair of holes 150, through which bolts (not illustrated in the drawings) are inserted when attaching to the vehicle body. In a state in which the back door attachment portion 148 has been attached to the back door that closes off the back door opening of the vehicle body, the back door attachment portion 148 is inclined with respect to the vertical direction.

A coupling portion 154 extends integrally from a vehicle body front side end portion of the back door attachment portion 148 toward the pin hole 156 in the vehicle body-side hinge member 118.

Figures 6C, 6D, 6E:
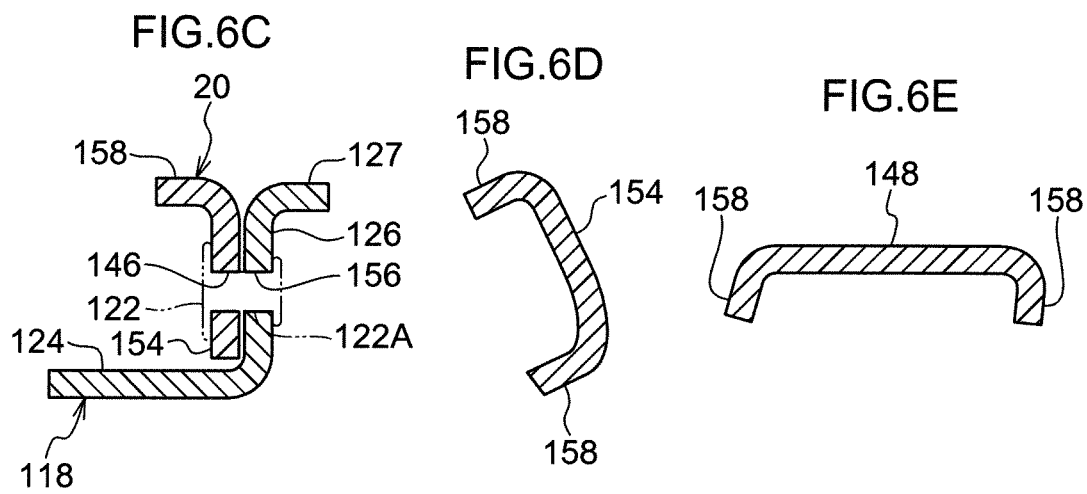
FIG. 6C is a cross-section of the hinge illustrated in FIG. 5A taken along line 6C-6C.
FIG. 6D is a cross-section of the hinge illustrated in FIG. 5A taken along line 6D-6D.
FIG. 6E is a cross-section of the hinge illustrated in FIG. 5A taken along line 6E-6E.

As illustrated in FIG. 6C, a pin fixing hole 146 is formed in the vehicle body front side of the coupling portion 154 at a position opposing the pin hole 156 of the vehicle body-side hinge member 118. The shaft 122A is fixed to the coupling portion 154 by swaging or the like in a state in which the shaft 122A of the rotation pin 122 has been inserted into the pin fixing hole 146. Accordingly, as illustrated in FIG. 6A, the back door-side hinge member 120 is capable of pivoting (in the arrow B direction) about the rotation pin 122, enabling the back door to open and close.

As illustrated in FIG. 5A, FIG. 5B, FIG. 6A, and FIG. 6B, a rib 158 is formed by pressing or the like so as to project out perpendicularly toward the vehicle width direction outside (arrow Y direction side) around substantially the entire periphery of edges of the back door attachment portion 148 and coupling portion 154, with the exception of at one portion. FIG. 5A is a perspective view illustrating the hinge 110 when the back door has been closed, and FIG. 6A is a front view illustrating the hinge 110 when the back door has been closed. As illustrated in FIG. 5A and FIG. 6A, the rib 158 of the back door-side hinge member 120 is not formed in the vicinity of the vehicle body attachment portion 124 of the vehicle body-side hinge member 118 so as not to interfere with the vehicle body-side hinge member 118 when the back door is closed. Note that the rib 158 of the present exemplary embodiment is formed with a uniform overall height.

Operation and Advantageous Effects

Similarly to the hinge 10 of the first exemplary embodiment, the vehicle body attachment portion 124 of the vehicle body-side hinge member 118 of the hinge 110 of the present exemplary embodiment is employed attached to the upper section of the vehicle body 12, and the back door attachment portion 148 of the back door-side hinge member 120 is employed attached to the back door 16 (see FIG. 1A and FIG. 2A).

In the hinge 110 of the present exemplary embodiment, the rib 158 is formed so as to continue along the back door attachment portion 148 as well as the coupling portion 154, thereby enabling the second moment of area of the back door attachment portion 148 to be further increased in comparison to configurations in which the rib 158 is not formed to the back door attachment portion 148. This thereby enables the twisting rigidity of the back door coupled to the vehicle body to be further improved, enabling the occurrence of noise caused by twisting deformation of the back door during travel to be suppressed.

In the hinge 110 of the present exemplary embodiment, the rib 127 is formed to the support wall 126 of the vehicle body-side hinge member 118, thereby raising the bending rigidity and twisting rigidity of the support wall 126 in comparison to configurations in which the rib 127 is not formed. Accordingly, bending deformation and twisting deformation of the support wall 126 can be further suppressed when load is input through the back door, and twisting rigidity of the back door 16 can be further improved in comparison to configurations in which the rib 127 is not formed.

Note that the step 42 and the protrusion 44 provided to the hinge 10 of the first exemplary embodiment may also be applied to the hinge 110 of the present exemplary embodiment. This would enable bending deformation and twisting deformation of the support wall 126 to be further suppressed.

Third Exemplary Embodiment

Explanation follows regarding a hinge 210 according to a third exemplary embodiment of the present disclosure, with reference to FIG. 7A, FIG. 7B, FIG. 8A to FIG. 8D, and FIG. 8E. Note that configurations matching those of the first exemplary embodiment are allocated the same reference numerals, and explanation thereof is omitted where appropriate.

Figure 8A:
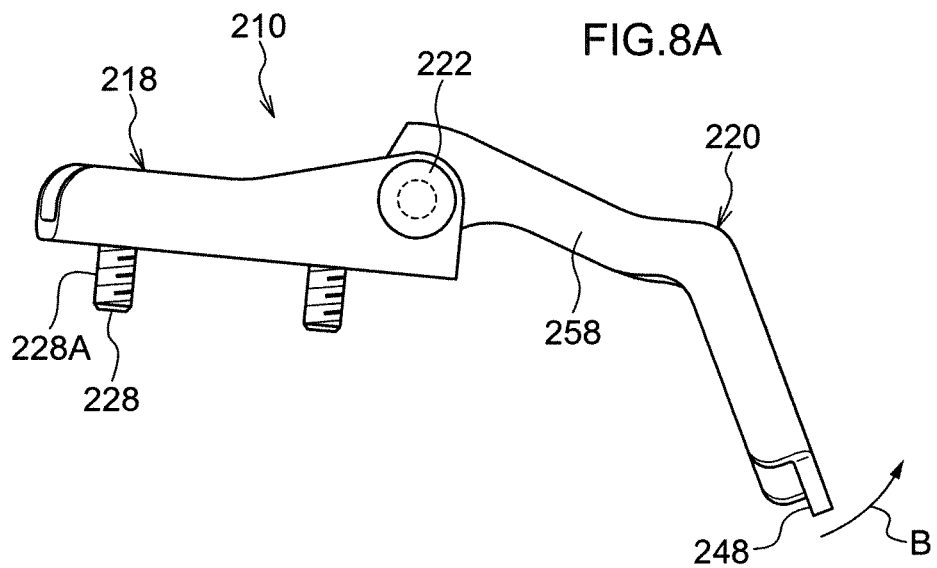
FIG. 8A is a front view illustrating a hinge according to the third exemplary embodiment.
Figure 8B:
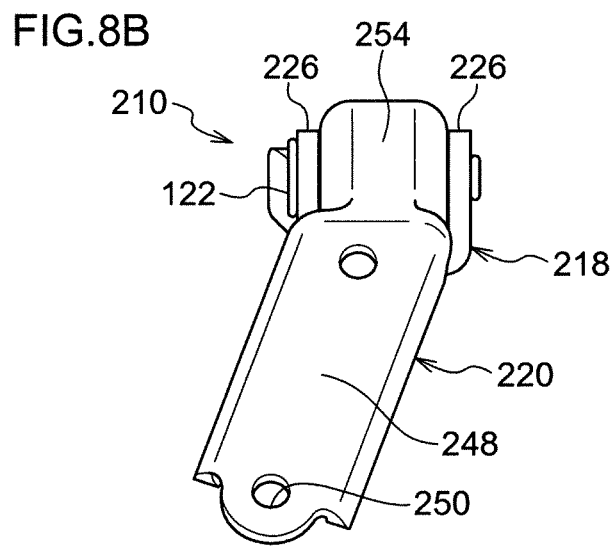
FIG. 8B is side view illustrating a hinge according to the third exemplary embodiment.

As illustrated in FIG. 7A and FIG. 8A, the hinge 210 of the present exemplary embodiment includes a vehicle body-side hinge member 218 that is attached to a vehicle body (not illustrated in the drawings), a back door-side hinge member 220 that is attached to a back door (not illustrated in the drawings), and a rotation pin 222 that supports the vehicle body-side hinge member 218 and the back door-side hinge member 220 so as to allow relative rotation of the vehicle body-side hinge member 218 and the back door-side hinge member 220.

The vehicle body-side hinge member 218 includes a vehicle body attachment portion 224 extending along the vehicle body front-rear direction (the arrow X direction and the opposite direction to the arrow X direction) and contacting and fixed to an upper section of the vehicle body. Upward extending support walls 226 are integrally formed to both vehicle width direction side (the arrow Y direction and the opposite direction to the arrow Y direction) edges of the vehicle body attachment portion 224. Note that the support walls 226 are perpendicular to the vehicle body attachment portion 224. The support walls 226 of the present exemplary embodiment are formed with gradually decreasing height on progression toward the vehicle body front side.

Two bolts 228 used to attach the vehicle body-side hinge member 218 to the vehicle body with nuts (not illustrated in the drawings) are joined to the vehicle body attachment portion 224 so as to be spaced apart from each other in the vehicle body front-rear direction. Threaded portions 228A of the bolts 228 project toward the lower side of the vehicle body attachment portion 224.

Upward facing ring shaped protrusions 232 are formed by pressing to an upper face of the vehicle body attachment portion 224. Heads 228B of the bolts 228 are joined to apex faces of the protrusions 232 by welding or the like.

A lower face of the vehicle body attachment portion 224 is formed with ring shaped recesses (not illustrated in the drawings) on the opposite side to the protrusions 232. Ring shaped water leakage prevention rubber packing (not illustrated in the drawings) is inserted into the recesses.

A pin hole 246 is formed in a vehicle body rear side of each of the support walls 226. A shaft 222A of the rotation pin 222 is rotatably inserted through the pin holes 246. Note that the shaft 222A is also inserted into and fixed to pin fixing holes 256 in a coupling portion 254, described later.

A vehicle body front side of the back door-side hinge member 220 is inserted between the pair of support walls 226. The back door-side hinge member 220 includes a flat plate shaped back door attachment portion 248 contacting and fixed to a side section inside portion of the back door (not illustrated in the drawings). The back door attachment portion 248 is formed with a pair of holes 250, through which bolts (not illustrated in the drawings) are inserted when attaching the back door attachment portion 248 to the back door. In a state in which the back door attachment portion 248 has been attached to the back door that has closed off the back door opening, as illustrated in FIG. 8A, the back door attachment portion 248 is inclined with respect to the vertical direction.

As illustrated in FIG. 7A, the plate shaped coupling portion 254 extends integrally from a vehicle body front side end portion of the back door attachment portion 248 toward the vehicle body-side hinge member 218.

Note that both width direction side edges of the back door attachment portion 248 and the coupling portion 254 are formed with ribs 258 projecting perpendicularly to the back door attachment portion 248 by pressing or the like.

Figures 8C, 8D, 8E:
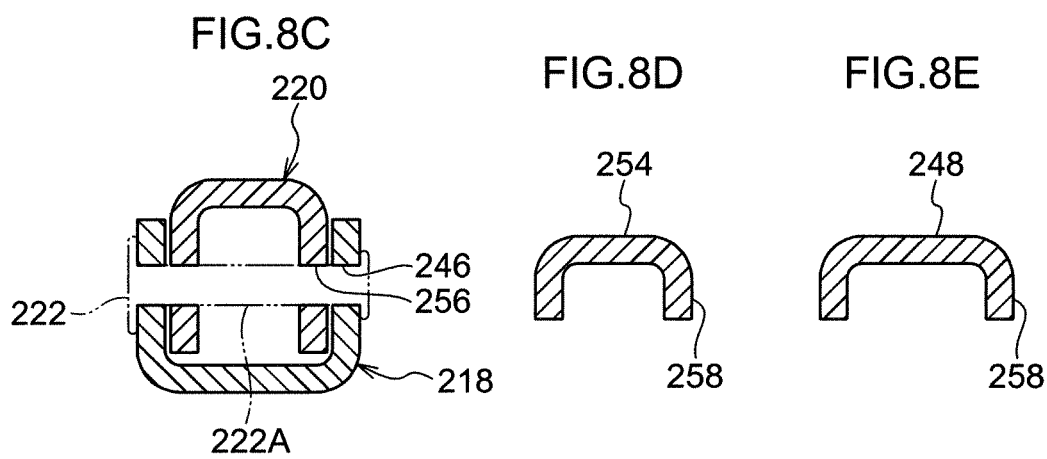
FIG. 8C is a cross-section of the hinge illustrated in FIG. 7A taken along line 8C-8C.
FIG. 8D is a cross-section of the hinge illustrated in FIG. 7A taken along line 8D-8D.
FIG. 8E is a cross-section of the hinge illustrated in FIG. 7A taken along line 8E-8E.

As illustrated in FIG. 8C, the vehicle body-side hinge member 218 side of each of the ribs 258 is formed with the pin fixing hole 256 at a position opposing the corresponding pin hole 246 of the vehicle body-side hinge member 218. The shaft 222A of the rotation pin 222 is inserted through the pin fixing holes 256. Note that the rotation pin 222 is fixed to the vehicle body-side hinge member 218. As illustrated in FIG. 8A, the back door-side hinge member 220 is thereby capable of pivoting (in the arrow B direction) about the rotation pin 222. This enables the back door to open and close.

Operation and Advantageous Effects

Similarly to the hinge 10 of the first exemplary embodiment, the vehicle body attachment portion 224 of the vehicle body-side hinge member 218 of the hinge 210 of the present exemplary embodiment is employed attached to the upper section of the vehicle body 12, and the back door attachment portion 248 of the back door-side hinge member 220 is employed attached to the back door 16.

In the hinge 210 of the present exemplary embodiment, the ribs 258 are formed on both width direction sides of the coupling portion 254, and the ribs 258 are also formed so as to continue on both width direction sides of the back door attachment portion 248. The second moment of area of the coupling portion 254 to the vehicle body-side hinge member 218, and of the back door attachment portion 248, can thus be increased in comparison to configurations in which the coupling portion 254 and the back door attachment portion 248 are not formed with the ribs 258. Employing the hinge 210 of the present exemplary embodiment thereby enables the twisting rigidity of the back door coupled to the vehicle body to be improved, and also enables the occurrence of noise caused by twisting deformation of the back door during travel to be suppressed.

In the hinge 210 of the present exemplary embodiment, the support walls 226 are formed on both width direction sides of the vehicle body attachment portion 224 of the vehicle body-side hinge member 218, and the back door-side hinge member 220 is supported by the two support walls 226, thereby suppressing bending deformation and twisting deformation of the support walls 226 in comparison to configurations in which the back door-side hinge member 220 is supported by a single support wall 226. This enables twisting rigidity of the back door 16 to be further improved.

EXAMPLES

Figure 9A:
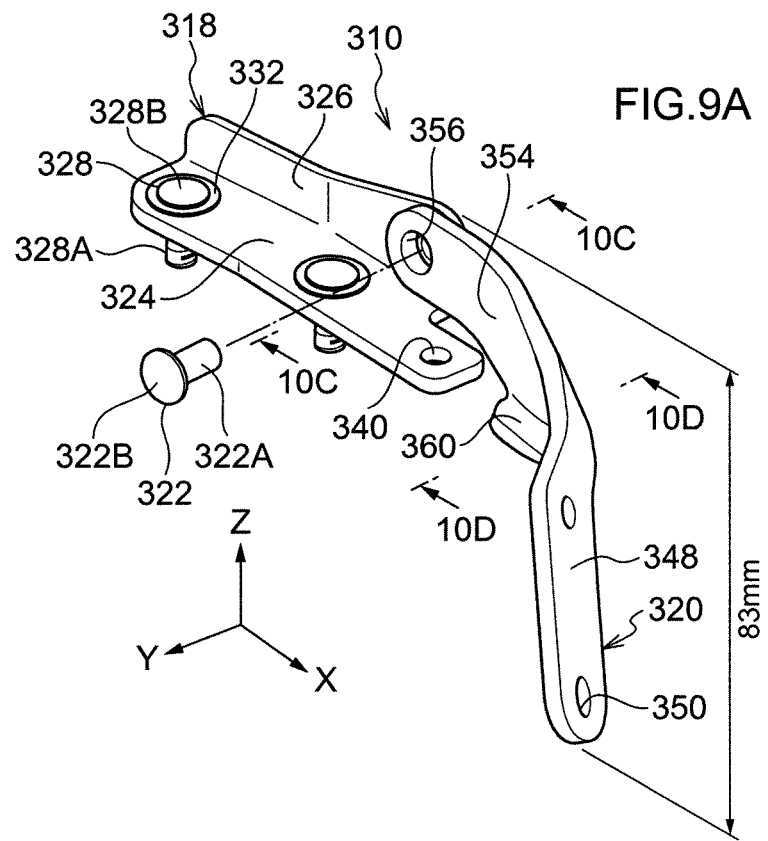
FIG. 9A is a perspective view illustrating a hinge according to a comparative example.
Figure 9B:
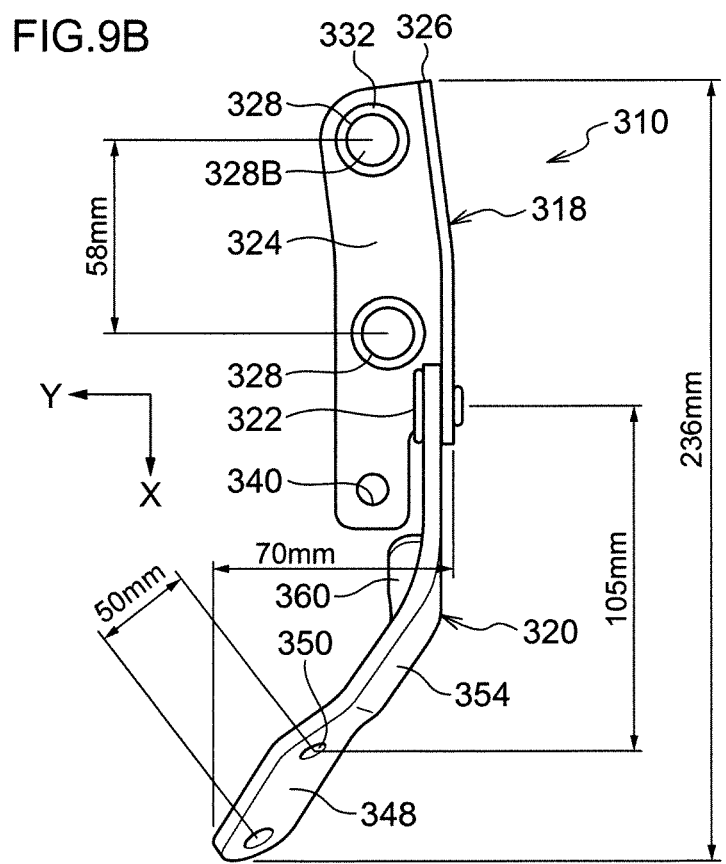
FIG. 9B is a plan view illustrating a hinge according to a comparative example.
Figure 10A:
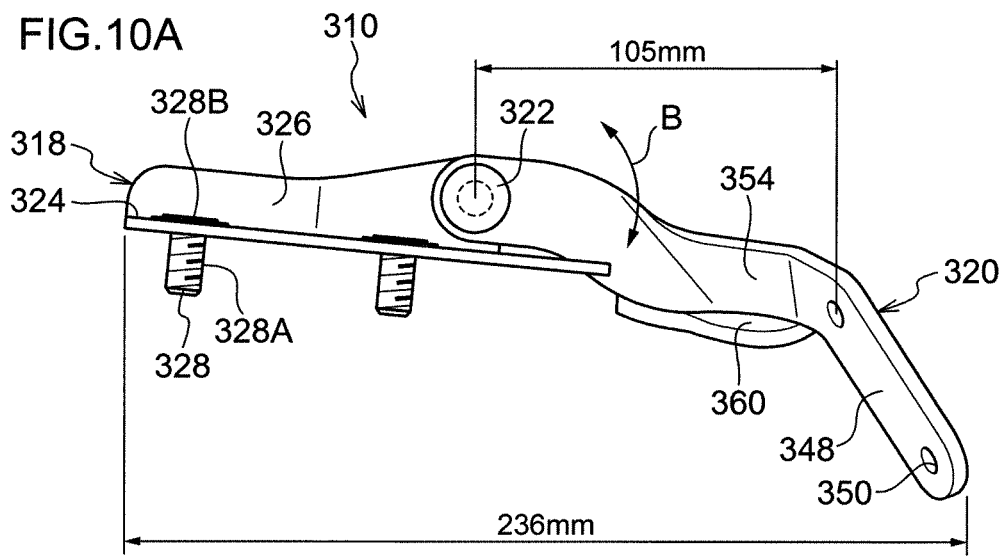
FIG. 10A is a front view illustrating a hinge according to a comparative example.
Figure 10B:
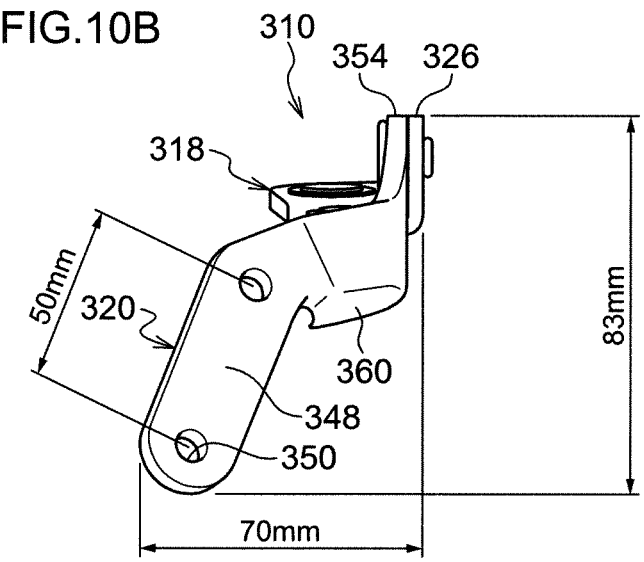
FIG. 10B is a side view illustrating a hinge according to a comparative example.
Figure 10C:
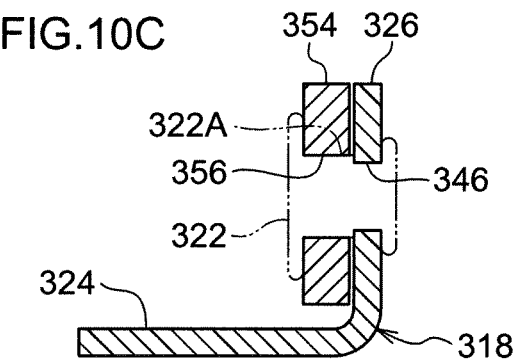
FIG. 10C is a cross-section of the hinge illustrated in FIG. 9A taken along line 10C-10C.
Figure 10D:
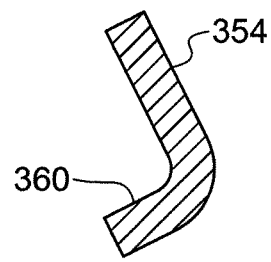
FIG. 10D is a cross-section of the hinge illustrated in FIG. 9A taken along line 10D-10D.
Figure 11A:
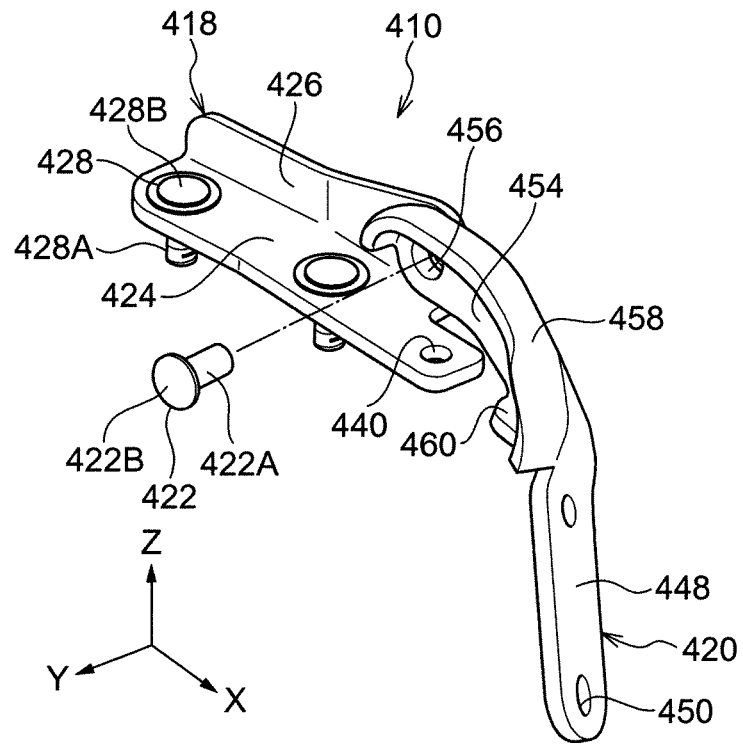
FIG. 11A is a perspective view illustrating a hinge according to an Example 1.
Figure 11B:
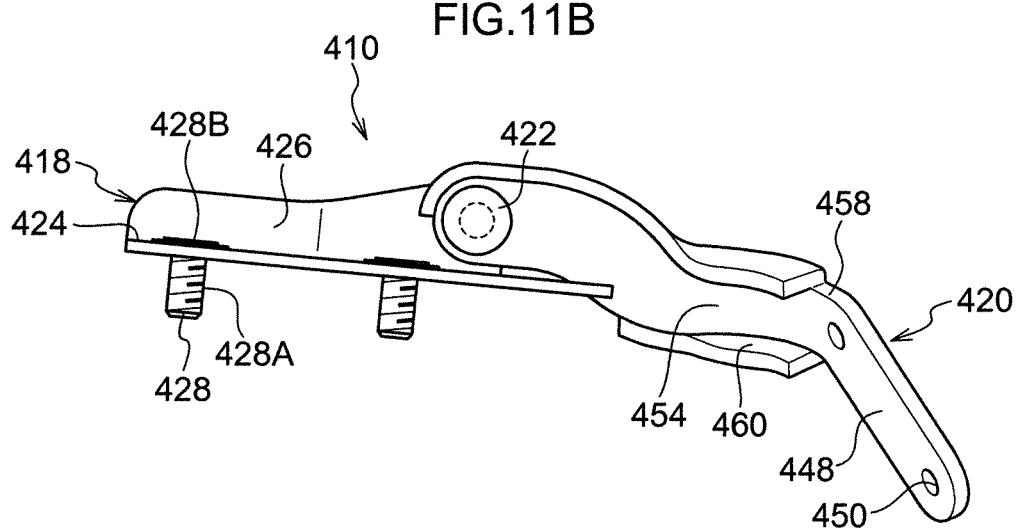
FIG. 11B is a front view illustrating a hinge according to Example 1.
Figure 12A:
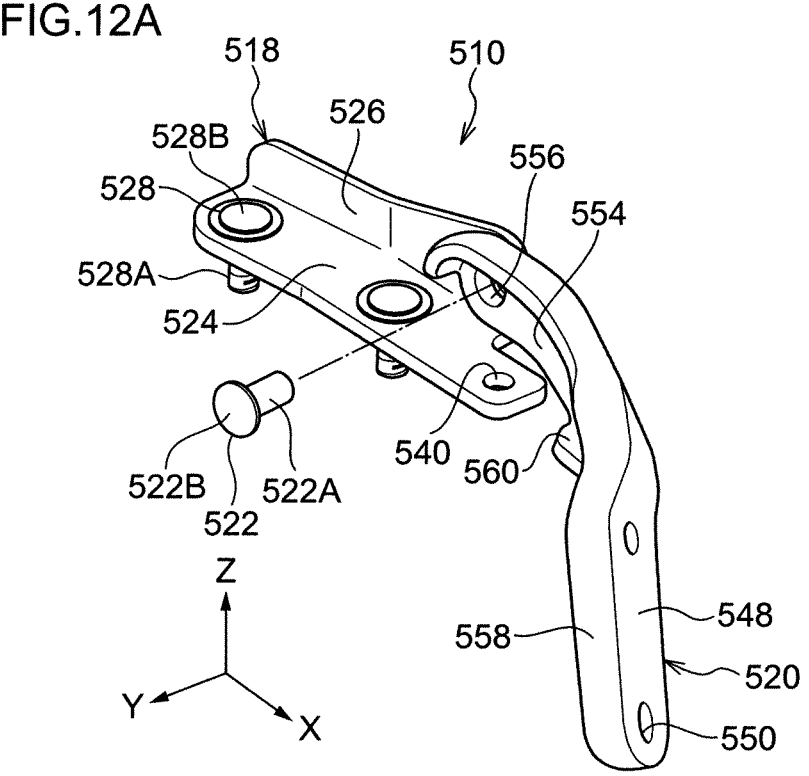
FIG. 12A is a perspective view illustrating a hinge according to an Example 2.
Figure 12B:
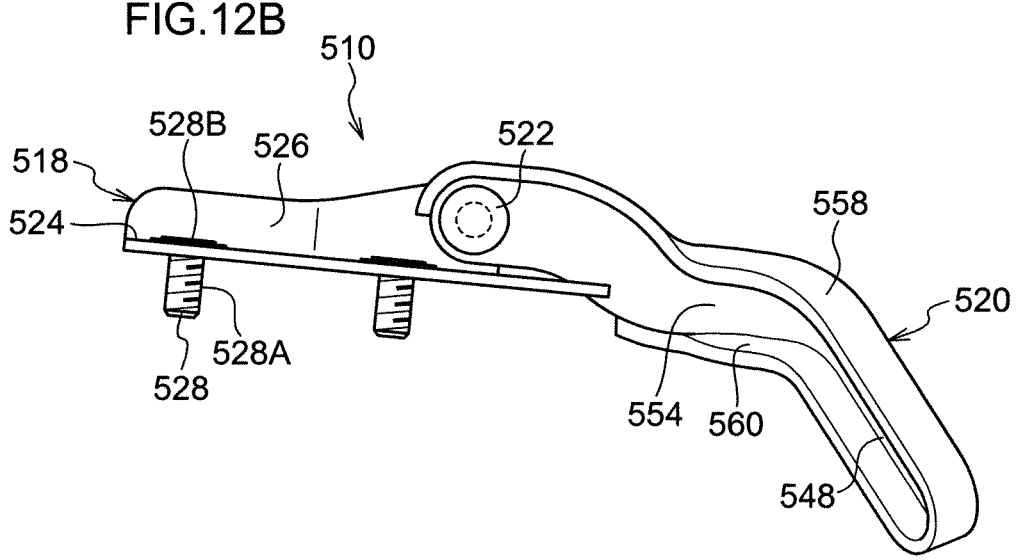
FIG. 12B is a front view illustrating a hinge according to Example 2.

In order to confirm the advantageous effects of the present disclosure, twisting deformation was compared in back doors supported by a hinge 310 according to a comparative example illustrated in FIG. 9A, FIG. 9B, FIG. 10A to FIG. 10C, and FIG. 10D, a hinge 410 of an Example 1 applied with the present disclosure, illustrated in FIG. 11A and FIG. 11B, and a hinge 510 of an Example 2 applied with the present disclosure, illustrated in FIG. 12A and FIG. 12B.

Hinge of Comparative Example

As illustrated in FIG. 9A and FIG. 10A, the hinge 310 includes a vehicle body-side hinge member 318 that is attached to a vehicle body, a back door-side hinge member 320 that is attached to a back door, and a rotation pin 322 that supports the vehicle body-side hinge member 318 and the back door-side hinge member 320 so as to allow relative rotation of the vehicle body-side hinge member 318 and the back door-side hinge member 320.

The vehicle body-side hinge member 318 is formed by pressing 3.2 mm thick sheet steel. The back door-side hinge member 320 is formed by pressing 5.0 mm thick sheet steel.

The vehicle body-side hinge member 318 includes a vehicle body attachment portion 324 extending along the vehicle body front-rear direction and contacting and fixed to an upper section of the vehicle body. A vehicle width direction inside edge of the vehicle body attachment portion 324 is integrally formed with a support wall 326 formed extending toward the upper side.

Two bolts 328 used to attach the vehicle body-side hinge member 318 to the vehicle body with nuts (not illustrated in the drawings) are joined to the vehicle body attachment portion 324 so as to be spaced apart from each other in the vehicle body front-rear direction (the arrow X direction and the opposite direction to the arrow X direction). A positioning hole 340 used for positioning is formed in a vehicle body rear side of the vehicle body attachment portion 324.

A pin hole 346 is formed in the vehicle body rear side of the support wall 326, and a shaft 322A of the rotation pin 322 is rotatably inserted through the pin hole 346. Note that the shaft 322A is fixed to a coupling portion 354, described later, by swaging or the like in a state in which the shaft 322A has been inserted through a pin fixing hole 356 in the coupling portion 354.

The back door-side hinge member 320 is disposed at the vehicle width direction outside (arrow Y direction side) of the support wall 326 of the vehicle body-side hinge member 318. The back door-side hinge member 320 includes a flat plate shaped back door attachment portion 348 contacting and fixed to a side section inside portion of the back door. A pair of holes 350 are formed in the back door attachment portion 348 for insertion of attachment bolts. As illustrated in FIG. 9A and FIG. 10A, in a state in which the back door attachment portion 348 is attached to a back door that has closed off a back door opening, the back door attachment portion 348 is inclined with respect to the vertical direction.

The plate shaped coupling portion 354 extends integrally from a vehicle body front side end portion of the back door attachment portion 348 toward the pin hole 346 in the vehicle body-side hinge member 318. The pin fixing hole 356 is formed in a vehicle body front side of the coupling portion 354 at a position opposing the pin hole 346 in the vehicle body-side hinge member 318. In a state in which the shaft 322A of the rotation pin 322 has been inserted through the pin fixing hole 356, the shaft 322A is fixed to the coupling portion 354 by swaging or the like. As illustrated in FIG. 10A, the back door-side hinge member 320 is thereby capable of pivoting (in the arrow B direction) about the rotation pin 322, thereby enabling the back door to open and close.

A rib 360 is formed projecting perpendicularly toward the vehicle width direction outside from the coupling portion 354 at a lower side edge of the coupling portion 354. As illustrated in FIG. 10A, in this comparative example, the rib 360 extends from the vicinity of a vehicle body front side end portion of the back door attachment portion 348 toward the vehicle body front side, and is formed along the entire length of the coupling portion 354.

Note that the dimensions of the hinge 310 (in mm) are given as appropriate in FIG. 9A, FIG. 9B, FIG. 10A, and FIG. 10B.

Hinge According to Example 1

Explanation follows regarding the hinge 410 according to Example 1, with reference to FIG. 11A and FIG. 11B. Note that in FIG. 11A and FIG. 11B, reference numerals applied to the configuration members of the hinge 410 correspond to the reference numerals for the hinge 310 of the comparative example described above, with the initial number 3 changed to 4. Explanation regarding configurations matching those of the hinge 310 of the comparative example is omitted.

The configuration of a back door-side hinge member 420 of the hinge 410 of Example 1 differs in part from that of the hinge 310 of the comparative example. Explanation follows regarding these differences.

As illustrated in FIG. 11A, an upper side edge of a coupling portion 454 of a back door-side hinge member 420 of the hinge 410 of Example 1 is formed with a rib 458 projecting perpendicularly toward the vehicle width direction outside from the coupling portion 454. As illustrated in FIG. 11B, the rib 458 extends from the vicinity of a vehicle body front side end portion of a back door attachment portion 448 to a vehicle body front side end portion of the coupling portion 454, and is formed over approximately half the total length of the coupling portion 454.

In the hinge 410 according to Example 1, ribs are formed on both width direction sides of the coupling portion 454 of the back door-side hinge member 420 in this manner.

Hinge According to Example 2

Explanation follows regarding the hinge 510 according to Example 2, with reference to FIG. 12A and FIG. 12B. Note that in FIG. 12A and FIG. 12B, reference numerals applied to the configuration members of the hinge 510 correspond to the reference numerals for the hinge 310 of the comparative example described above, with the initial number 3 changed to 5. Explanation regarding configurations matching those of the hinge 310 of the comparative example is omitted.

The configuration of a back door-side hinge member 520 of the hinge 510 of Example 2 differs in part from that of the hinge 310 of the comparative example.

As illustrated in FIG. 12A, in a back door-side hinge member 520 of the hinge 510 of Example 2, a rib 558 of a coupling portion 554 extends toward a back door attachment portion 548 side, is formed around the entire periphery of an edge of the back door attachment portion 548, and is connected to a rib 560 formed at a lower side edge of the coupling portion 554.

The back door employed in testing is configured including a resin inner panel and a resin outer panel. For the resin inner panel, a glass fiber composite polypropylene material containing 30% by mass glass fiber is employed, and for the resin outer panel, a polypropylene material (hereafter, abbreviated to bumper PP) blended with talc, rubber or the like commonly employed in vehicle resin bumpers is employed. The basic sheet thickness of the resin inner panel is 2.5 mm, and the basic sheet thickness of the resin outer panel is 2.8 mm.

In particular, the resin inner panel is responsible for most of the rigidity and strength of the back door. The glass fiber composite polypropylene material containing 30% by mass glass fiber has a Young's modulus of 4950 MPa, and the bumper PP has a Young's modulus of 1600 MPa.

1.4 mm thick steel reinforcement is assembled to a hinge section, a lock section, and a damper attachment section of the resin inner panel of the back door.

Test Method

Figure 13:
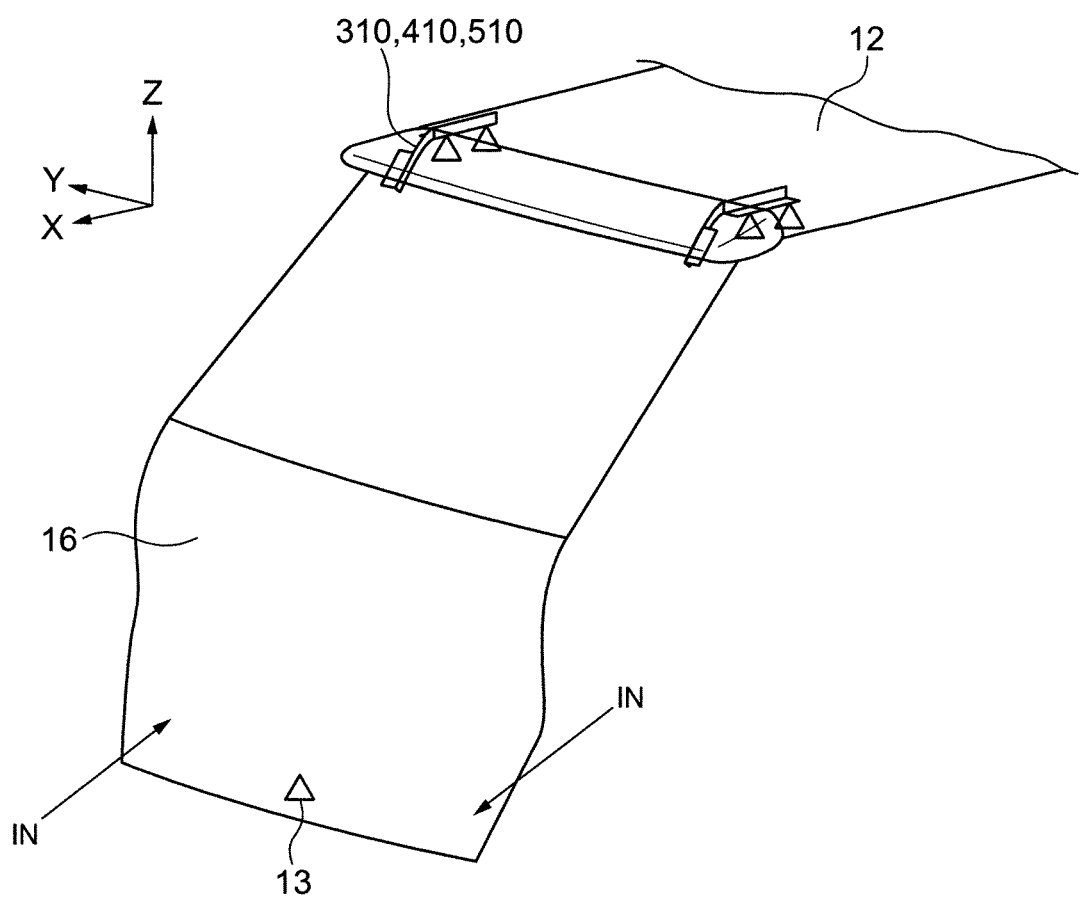
FIG. 13 is a perspective view illustrating a schematic configuration of a vehicle body model employed in analysis.

CAE analysis software (ABAQUS 6.11-1: manufactured by Dassault Systèmes) was employed on the model illustrated in FIG. 13, in which a vehicle body and a back door were coupled together by the test hinge, and twisting rigidity of an attached resin back door 16 was evaluated. In order to evaluate twisting rigidity in the vehicle width direction of the resin back door 16, boundary conditions were set of: complete restraint at the join locations between the hinges 310, 410, 510 and the vehicle body 12, and translational restraint only at the interlocking point of a lock section 13 to lock the back door 16, with free rotating movement allowed thereat. Force from a damper was not applied to the resin back door 16, and a force couple was applied in the directions of the illustrated arrows IN to each side of a lower section of the resin back door 16. A comparison was then performed of displacement amounts at the load points of the back door 16 applied with the force couple.

Evaluation is expressed using an index in which the inverse of the displacement amount of the comparative example is 100. Greater numerical values of the index indicate greater twisting rigidities in comparison to the comparative example, namely greater twisting rigidity ratios.

TABLE 1

|  | Comparative example | Example 1 | Example 2 |
|---|---|---|---|
| Relative twisting rigidity (expressed as index) | 100 | 108 | 111 |
| Increase in door mass (relative to comparative example) | — | +0.32 kg | +0.11 kg |

It can be seen from the test results that employing the hinge of Example 1, in which ribs are provided on both width direction sides of the coupling portion, suppresses twisting deformation of the back door. Moreover, it can be seen that employing the hinge of Example 2, in which a rib is provided to the back door attachment portion as well as being provided on both width direction sides of the coupling portion, further suppresses twisting deformation of the back door.

It can be seen from the test results that the hinges applied with the Examples are more capable of suppressing twisting deformation of the back door than the comparative example, thereby enabling the occurrence of noise to be suppressed while maintaining the light weight of the back door.

OTHER EXEMPLARY EMBODIMENTS

Although explanation has been given regarding exemplary embodiments of the present disclosure, the present disclosure is not limited to the above, and obviously various other modifications may be implemented within a range not departing from the spirit of the present disclosure.

In the exemplary embodiments described above, the vehicle body-side hinge members and back door-side hinge members of the hinges are configured by pressed sheet steel components. However, the present disclosure is not limited thereto. The configuration members of the hinges may employ a configuration other than pressed sheet steel components, for example die cast metal components, or molded fiber-reinforced plastic components.

The disclosure of Japanese Patent Application No. 2017-068152, filed on Mar. 30, 2017, is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A hinge, comprising:
a vehicle body-side hinge member that includes a vehicle body attachment portion for attachment to a vehicle body;
a back door-side hinge member that includes a door attachment portion for attachment to a back door and a coupling portion extending from the door attachment portion toward the vehicle body-side hinge member, the back door-side hinge member including a reinforcing rib which is continuous along an entire periphery of an edge portion of the door attachment portion such that the reinforcing rib extends from a first edge, in a width direction intersecting an extension direction of the coupling portion, to a second edge, in the width direction intersecting the extension direction of the coupling portion; and
a rotational support member that couples an end portion, at a side of the vehicle body-side hinge member, of the coupling portion together with the vehicle body-side hinge member, and that supports the vehicle body-side hinge member and the back door-side hinge member so as to allow relative rotation of the vehicle body-side hinge member and the back door-side hinge member.

2. The hinge of claim 1, wherein:
the vehicle body attachment portion includes a support wall that is configured to extend along a front-rear direction of the vehicle body and that supports the rotational support member; and
the support wall includes a step that is configured to be disposed in a width direction of the vehicle body and that is coupled to the vehicle body attachment portion.

* * * * *